United States Patent [19]

Batchelor

[11] Patent Number: 5,169,606

[45] Date of Patent: * Dec. 8, 1992

[54] OZONE GENERATOR APPARATUS

[75] Inventor: Douglas R. Batchelor, Chicago, Ill.

[73] Assignee: American Ozone Systems, Inc., Chicago, Ill.

[*] Notice: The portion of the term of this patent subsequent to Apr. 16, 2008 has been disclaimed.

[21] Appl. No.: 600,550

[22] Filed: Feb. 26, 1991

Related U.S. Application Data

[63] Continuation-in-part of Ser. No. 534,035, Jun. 6, 1990, Pat. No. 5,008,087.

[51] Int. Cl.⁵ .............................................. B01J 19/08
[52] U.S. Cl. ........................... 422/186.19; 422/186.22; 422/186.07
[58] Field of Search .............. 422/186, 186.04, 186.07, 422/186.15, 186.16, 186.18, 186.21, 186.14, 186.19; 204/176

[56] References Cited

U.S. PATENT DOCUMENTS

| | | |
|---|---|---|
| 470,425 | 3/1892 | Grumbacher . |
| 1,050,260 | 1/1913 | Walden ...................... 422/186.06 |
| 2,326,601 | 8/1943 | Arff ..................................... 204/320 |
| 2,353,770 | 7/1944 | Suits .................................... 204/171 |
| 2,785,119 | 3/1957 | Cook et al. .......................... 204/169 |
| 2,850,446 | 9/1958 | Cromwell ............................ 204/176 |
| 2,857,323 | 10/1958 | Cromwell ............................ 204/176 |
| 2,921,892 | 1/1960 | Casey ................................... 204/164 |
| 3,214,364 | 10/1965 | Van Tuyle et al. ............ 422/186.19 |
| 3,309,300 | 3/1967 | Grosse et al. ....................... 204/176 |
| 3,364,129 | 1/1968 | Cremer et al. ...................... 204/321 |
| 3,438,136 | 4/1969 | Raymond ............................... 34/72 |
| 3,442,788 | 5/1969 | Wooton et al. ..................... 204/317 |
| 3,565,776 | 2/1971 | Arff ..................................... 204/320 |
| 3,607,709 | 9/1971 | Rice ..................................... 204/317 |
| 3,623,970 | 11/1971 | Haas .................................... 204/314 |
| 3,784,838 | 1/1974 | Lowther .............................. 250/536 |
| 3,838,290 | 9/1974 | Crooks ................................ 250/532 |
| 3,865,733 | 2/1975 | Taylor ................................. 250/532 |
| 3,883,413 | 5/1975 | Douglas-Hamilton ............. 204/176 |
| 3,891,561 | 6/1975 | Lowther .............................. 250/541 |
| 3,899,682 | 8/1975 | Lowther .............................. 250/532 |
| 3,903,426 | 9/1975 | Lowther .............................. 250/532 |
| 3,954,586 | 5/1976 | Lowther .............................. 204/176 |
| 3,967,131 | 6/1976 | Slipiec et al. ....................... 250/539 |
| 3,973,133 | 8/1976 | Emigh et al. ....................... 250/532 |
| 3,984,697 | 10/1976 | Lowther .............................. 250/532 |
| 4,048,668 | 9/1977 | Von Bargen et al. .............. 361/235 |
| 4,062,748 | 12/1977 | Imris ................................... 204/176 |
| 4,095,115 | 6/1978 | Orr, Jr. et al. ..................... 250/538 |
| 4,128,768 | 12/1978 | Tamamoto et al. ................ 250/535 |
| 4,152,603 | 5/1979 | Imris ................................... 250/535 |
| 4,167,484 | 9/1979 | Morikawa ........................... 250/533 |
| 4,214,995 | 6/1980 | Saylor ................................. 250/539 |
| 4,216,096 | 8/1980 | Pare et al. ........................... 250/539 |

(List continued on next page.)

FOREIGN PATENT DOCUMENTS

| | | |
|---|---|---|
| 350905 | 1/1990 | European Pat. Off. . |
| 479484 | 10/1969 | Fed. Rep. of Germany . |
| 56-160302 | 3/1982 | Japan . |
| 1157720 | 7/1969 | United Kingdom . |

Primary Examiner—Donald P. Walsh
Assistant Examiner—Daniel Jenkins
Attorney, Agent, or Firm—Marshall, O'Toole, Gerstein, Murray & Bicknell

[57] ABSTRACT

A tubular type ozone generator with inner and outer concentric electrodes and a middle dielectric member. One end is sealed to permit feed gas traversing the inner gap between the inner electrode and the dielectric member to reverse direction and to traverse the outer gap between the dielectric member and the outer electrode. A method for producing ozone using a tubular type ozone generator where first the total feed gas is passed in one direction between an electrode and the dielectric member for producing ozone, reversed, and then passed in the reverse direction between the dielectric member and the other electrode producing additional ozone. A hollow inner electrode permits more efficient cooling of the inner electrode. A plurality of ozone generators are combined with intake and output manifolds for the feed gas and produced ozone.

8 Claims, 5 Drawing Sheets

U.S. PATENT DOCUMENTS

| | | | |
|---|---|---|---|
| 4,232,229 | 11/1980 | Tanaka et al. | 250/541 |
| 4,234,800 | 11/1980 | Kenly et al. | 250/540 |
| 4,293,775 | 10/1981 | Feuerstake et al. | 250/535 |
| 4,320,301 | 3/1982 | Kogelschatz | 422/186.18 |
| 4,383,976 | 5/1983 | Notaro | 422/186.18 |
| 4,410,495 | 10/1983 | Bassler et al. | 422/186.18 |
| 4,417,966 | 11/1983 | Krauss et al. | 204/176 |
| 4,430,306 | 2/1984 | Namba et al. | 422/292 |
| 4,461,744 | 6/1984 | Erni et al. | 422/186.18 |
| 4,504,446 | 3/1985 | Kunicki et al. | 422/186.19 |
| 4,541,989 | 9/1985 | Foller | 422/186.07 |
| 4,545,960 | 10/1985 | Erz et al. | 422/186.12 |
| 4,603,031 | 7/1986 | Gelbman | 422/186.18 |
| 4,606,892 | 8/1986 | Bachhofer et al. | 422/186.2 |
| 4,614,573 | 9/1986 | Masuda | 204/176 |
| 4,619,763 | 10/1986 | O'Brien | 210/177 |
| 4,640,782 | 2/1987 | Burleson | 210/748 |
| 4,650,573 | 3/1987 | Nathanson | 210/136 |
| 4,650,648 | 3/1987 | Beer et al. | 422/186.07 |
| 4,654,199 | 3/1987 | Gloor et al. | 422/186.19 |
| 4,655,933 | 4/1987 | Johnson et al. | 210/721 |
| 4,656,010 | 4/1987 | Leitzke et al. | 422/186.18 |
| 4,668,479 | 5/1987 | Manabe et al. | 422/186.05 |
| 4,690,803 | 9/1987 | Hirth | 422/186.18 |
| 4,693,869 | 9/1987 | Pfaff | 422/186.04 |
| 4,693,870 | 9/1987 | Gloor et al. | 422/186.19 |
| 4,696,800 | 9/1987 | Sasaki et al. | 422/186.18 |
| 4,705,670 | 11/1987 | O'Hare | 422/186.04 |
| 4,725,412 | 2/1988 | Ito | 422/186.19 |
| 4,752,866 | 6/1988 | Huynh et al. | 363/138 |
| 4,764,349 | 8/1988 | Arff et al. | 422/186.18 |
| 4,770,858 | 9/1988 | Collins | 422/186.18 |
| 4,774,062 | 9/1988 | Heinemann | 422/186.19 |
| 4,780,287 | 10/1988 | Zeff et al. | 422/186.3 |
| 4,790,980 | 12/1988 | Erni et al. | 422/186.15 |
| 4,816,229 | 3/1989 | Jensen et al. | 422/186.2 |
| 4,818,498 | 4/1989 | Bachhofer et al. | 422/186.2 |
| 4,834,948 | 5/1989 | Schmiga et al. | 422/186.19 |
| 4,842,829 | 6/1989 | Hirai et al. | 422/186.08 |
| 4,954,321 | 9/1990 | Jensen | 422/186.19 |
| 5,008,087 | 4/1991 | Batchelor | 422/186.22 |

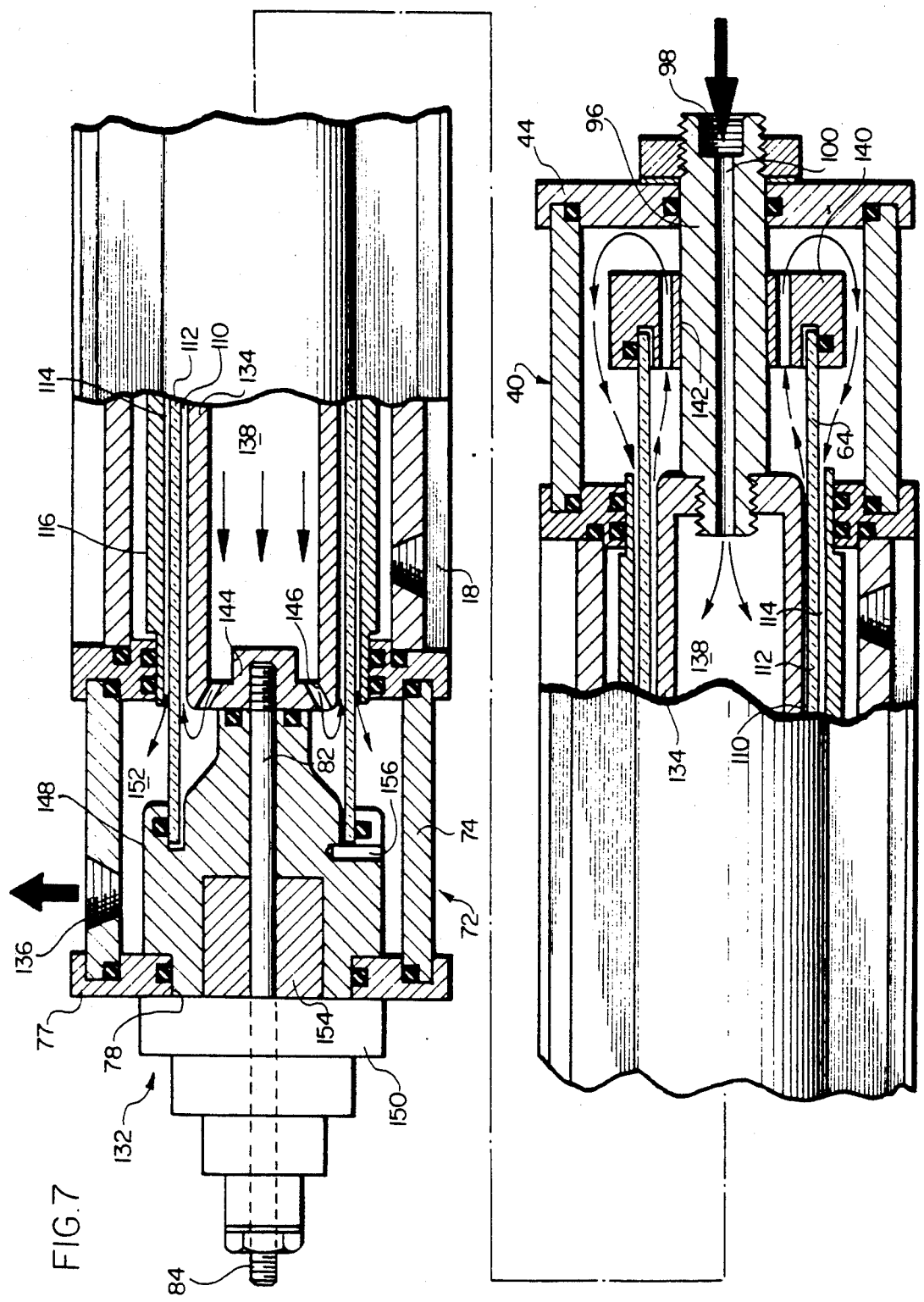

OZONE GENERATOR APPARATUS

This is a continuation-in-part application of Ser. No. 07/534,035, filed Jun. 6, 1990, now U.S. Pat. No. 5,008,087.

This invention relates to ozone generation using electrical discharges and more particularly to tubular type ozone generator apparatus and methods of ozone generation using such apparatus.

BACKGROUND OF THE INVENTION

Reference may be made to the following U.S. patents of interest: U.S. Pat. Nos. 3,214,364; 4,417,966; 3,967,131; 3,984,697; 4,504,446; 4,818,498; 4,234,800; 4,774,062; 4,954,321.

Ozone has been used as a disinfectant and oxidant in industrial, commercial, municipal and recreational water use for over 80 years. One technique for producing ozone uses elongated tubular electrodes concentrically spaced from each other with an elongated tubular dielectric member concentrically spaced in between the inner and outer electrodes. In some cases, the inner electrode may consist of a surface plating on the inside surfaces of the elongated dielectric member. A feed gas, such as air or oxygen is inserted at one end of the ozone generator and in the annular gap between the outer electrode and the dielectric member. Applying a high voltage between the electrodes creates a corona discharge of the gas through the dielectric member and thereby creates ozone.

Generally, a cooling water jacket surrounds the grounded outer electrode to provide cooling for the unit. The dielectric member is typically constructed of glass or ceramic material, tubular shaped, and is supported by spring members contacting the tubular outer glass surface between the electrodes.

The corona discharge between the electrodes creates a substantial amount of heat which not only can lead to cracks in the dielectric member, but also results in inefficient ozone generation. Thus, one of the problems inherent in the typical ozone generator herein discussed is failure of the electrode assembly due to cracks in the dielectric member. Hot spots in the glass at the support spring locations and other heat induced stresses cause cracks and burn throughs leading to eventual failure of the dielectric member. This results in equipment shutdown and requires costly and time consuming repairs of the unit.

In addition, the ozone which is formed during the discharge is subject to being destroyed if maintained in the discharge zone at temperatures greater than about 130° Farenheit (54° Centigrade). Therefore it is desired for maximum efficiency of ozone production to maintain the gas temperatures less than 130° Farenheit (54° Centigrade), and preferably between about 70°–90° Farenheit (21°–32° Centigrade). Some degree of cooling is afforded by the presence of the cooling water acting on the outer electrode, but this has a minor cooling effect on the dielectric member. Secondly, while there is some cooling afforded by the feed gas which is split for simultaneously traversing in one direction the annular gaps between the outer electrode and the dielectric member, and between the dielectric member and the inner electrode, inefficient ozone production and low operating life of the dielectric member limit the usefulness of prior ozone generators.

Accordingly, it is desired to provide improved ozone generator apparatus and methods of ozone generation featuring increased reliability and high ozone generation efficiency wherein the following problems of prior units and the operation thereof are reduced or eliminated:
1. Reducing the stress and hot spots on the dielectric member due to the heat build-up during corona discharge so as to extend the life of the electrode assembly; and
2. Increasing the efficiency of ozone production.

SUMMARY OF THE INVENTION

An improved tubular type ozone generator with reversing gas direction apparatus and method of operation is provided. An improved support for the dielectric member is provided which eliminates the need for support members between the inner and outer electrodes.

In accordance with one aspect of the present invention, there is provided a tubular type ozone generator unit with elongated inner and outer concentrically spaced electrodes and an elongated tubular dielectric member supportedly spaced between the electrodes with improved support means. Opposite ends of the tubular dielectric member extend beyond the inner electrode ends and are supported by insulating end support blocks. No spring support members are needed to support the dielectric member between the electrodes.

Means are provided for supplying a gas such as air under pressure to the annular inner gap between the inner electrode and the dielectric member such that all of the gas traverses from a first gas feed end of the ozone generator to the opposite gas return end so as to produce ozone and also cool the inner surface of the dielectric member. At the opposite end, sealing means are provided to reverse the flow of ozone and feed gas and to direct it into the annular outer gap between the dielectric member and the outer electrode to produce more ozone. All of the gas is passed back to its starting point at the gas feed end of the ozone generator and the developed ozone can be collected from a suitable outlet at that point. The reversing gas flow cools the outer surface of the dielectric member to desirably reduce the temperature differential between the inside and the outside of the dielectric thereby reducing the stress on the dielectric member and extending the life of the electrode assembly.

It has been found that using the total gas flow in one direction first to develop ozone and to cool off the inside surface of the dielectric member and then reversing all of the gas to the opposite direction to develop more ozone and cool off the outside surface of the dielectric, as well as eliminating the spring support members between the electrodes, provides a resulting reduction in temperature differential between the inside and outside surfaces of the dielectric and eliminates hot spots and stresses—which leads to a significant increase in dielectric reliability.

Additionally, it has been found that the reversing gas direction apparatus and method of the present invention results in an increased production of ozone output and concentration of about 50% or more compared to prior units due to an increase in the effective surface area of the dielectric. Thus, increased ozone output and concentration are achieved without increasing the number of electrodes in order to obtain a desired ozone output. If desired, a plurality of tubular type ozone generators according to the invention can be coupled together in the same cabinet with suitable input and output gas manifolds.

In an alternative embodiment of the invention, a hollow inner electrode is provided and the feed gas is supplied to the interior at one end of the inner electrode with the gas efficiently cooling the inside surface of the inner electrode. Then, as in the first embodiment, the gas direction is reversed to cool both the inner and outer surfaces of the dielectric. The gas traverses the annular inner gap between the inner electrode and the dielectric member towards one end of the electrode assembly where sealing means are provided to again reverse the direction of the gas so that all of the gas traverses the annular outer gap between the dielectric member and the outer electrode and arrives at the opposite end where the ozone may be removed through a suitable outlet port.

In a preferred hollow inner electrode embodiment, the feed gas inlet and the ozone outlet are at opposite ends of the ozone generator. The feed gas is coupled from an inlet, preferably at the top of the ozone generator, through electrode and dielectric support means to the top of the inner electrode for conveying gas under pressure to the inner electrode interior. An opposite apertured end wall in the electrode enables the feed gas to exit the electrode interior at the bottom end, reverse direction and traverse upwardly in the inner space between the inner electrode and the dielectric member. At the ozone generator top end the gas passes through an apertured end cap supporting the dielectric member, reverses direction and traverses downwardly in the outer space between the dielectric member and the outer electrode to exit the ozone outlet at the bottom.

An insulating support rod extends through the apertured end cap and is mounted to the ozone generator support frame and to the top of the inner electrode to communicate the feed gas through a passageway from a gas inlet port to the hollow interior of the inner electrode and to support the inner electrode and the dielectric member. A support insulator assembly at the ozone generator bottom end supports the dielectric member and the inner electrode and forms a reversing input gas chamber feeding gas to the inner space to develop ozone, while also forming an ozone outlet chamber for receiving ozone from the outer space. The support insulator assembly includes a ceramic plug portion to inhibit high voltage breakdown of the insulator in the space between the grounded support frame and a high voltage conductor connection to the inner electrode. A bleed hole in the support insulator assembly permits any contaminant buildup in the inner space between the inner electrode and the dielectric member to exit the inner space so as to prevent degrading the quality of the developed ozone.

In all of the embodiments the input and output ports may be reversed so that the feed gas may be supplied to the original output port and the resulting ozone concentrated gas may be withdrawn from the original input port.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 7 is a longitudinal cross-sectional fragmented view illustrating another alternative embodiment of the invention.

DETAILED DESCRIPTION

Figures 1, 2:
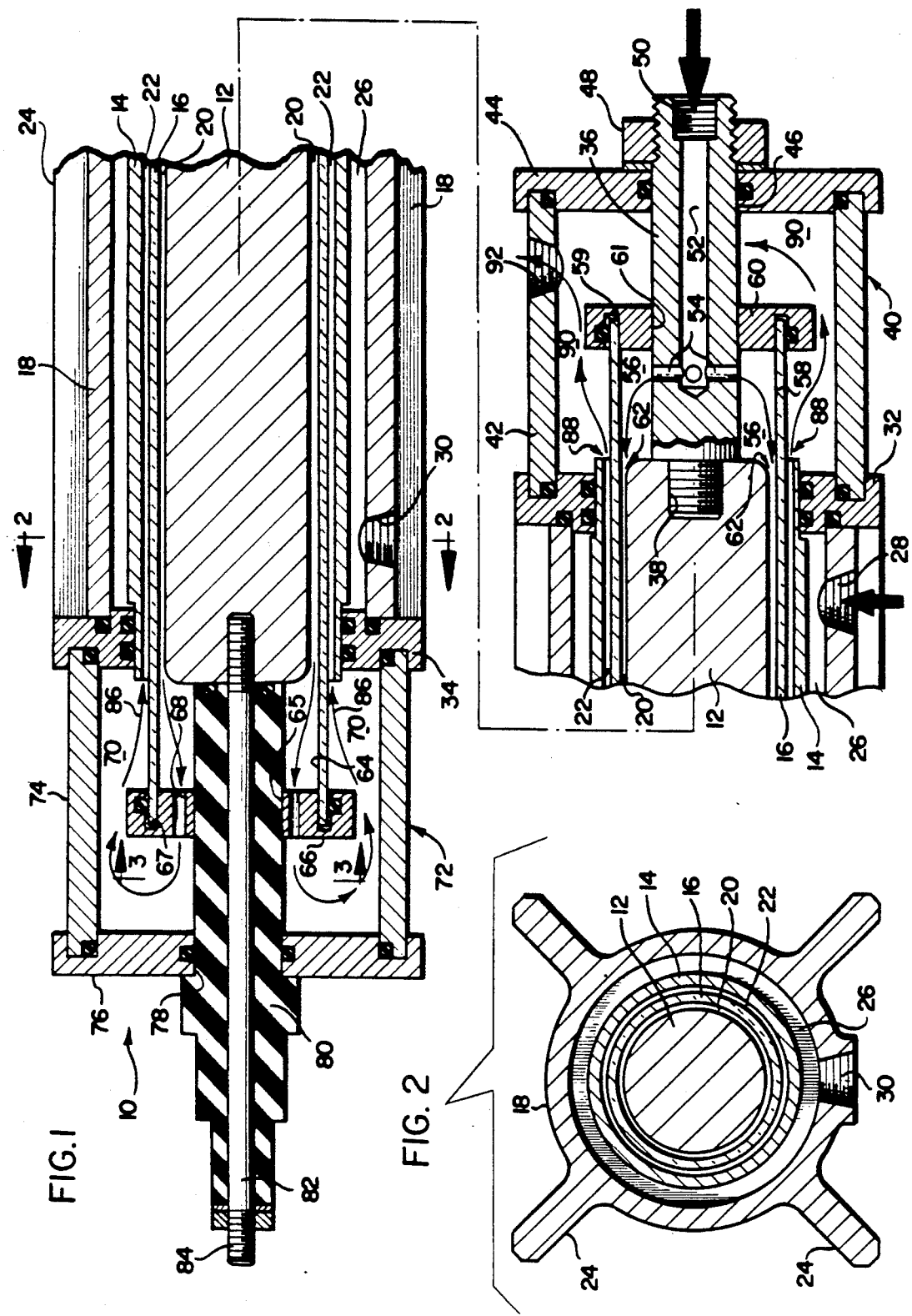
FIG. 1 is a longitudinal cross-sectional fragmented view of a tubular type ozone generator constructed in accordance with the principles of the present invention.
FIG. 2 is a cross-sectional view taken along section lines 2—2 of FIG. 1.

Reference may be made to the drawings wherein there is illustrated a tubular type ozone generator 10 which includes a high voltage electrode assembly for generating ozone from a feed gas comprising an elongated inner electrode 12 spacially separated from an elongated tubular outer electrode 14 with an elongated tubular dielectric member 16 therebetween. Electrodes 12, 14 are formed of stainless steel. Dielectric member 16 is formed of a glass dielectric material, such as borosilicate.

The electrodes and the dielectric member are mounted in a housing 18 so that there is an elongated annular inner gap 20 between inner electrode 12 and dielectric member 16 and an elongated annular outer gap 22 between dielectric member 16 and outer electrode 14. Housing 18 may be formed of an aluminum extrusion in the form of an elongated cylindrical member with a plurality of support legs 24.

As shown in FIG. 2, the diameter of housing 18 is much larger than the diameter of outer electrode 14 so as to form a gap 26 for a cooling water jacket around the electrode assembly. A cooling water inlet 28 is provided at one end of housing 18 for supplying cooling water to gap 26 and outer electrode 14 so that the water can cool the outer electrode and exit through a cooling water outlet 30. Respective housing end caps 32, 34 are provided at opposite ends of the housing with suitable O-ring seals to seal the ends of housing 18 to the respective ends of the outer electrode and thereby maintain the cooling water within gap 26.

At the gas feed end of the ozone generator, there is provided a support rod 36 formed of an insulating material and with one threadable end 38 for threadably engaging inner electrode 12 and an opposite end which extends through a support frame 40. Support frame 40 also forms a gas sealing end cap at one end of the ozone generator and includes a spacer tube 42 mounted with suitable O-rings to end cap 32 at one end and to a sealing support plate 44 at the other end. Support plate 44 includes an aperture 46 adapted to accommodate support rod 36. A lock washer and mounting nut combination 48 threadably engage the end of rod 36 to maintain inner electrode 12 supportedly mounted at one end and within housing 18.

Rod 36 includes an air or gas inlet 50 coupled to an elongated passageway 52 and four transverse passageways 54 leading to an annular antechamber 56. Antechamber 56 is bounded within a dielectric member end extension 58, with inner electrode 12 at one end and a support/sealing block 60 supporting extension 58 at the other end. As seen in FIG. 1, the end of extension 58 is inserted into an annular groove 59 with an O-ring seal in block 60. Aperture 61 in block 60 is adapted to snugly fit on support rod 36 so as to supportedly mount dielectric member 16 at one end and within housing 18. Gas inlet 62 leads the input gas in antechamber 56 to inner gap 20 between inner electrode 12 and dielectric member 16 to develop ozone in gap 20.

At the opposite gas return end of the electrode assembly, a dielectric member end extension 64 is supportedly mounted in housing 18 by an apertured end cap 66 mounted to extension 64 similar to the mounting of block 60 on extension 58. Cap 66 includes an aperture 65 and an annular groove 67 for receiving the end of extension 64. Both block 60 and cap 66 are formed of insulating material, such as an elastomeric resin.

Cap 66 also includes a plurality of apertures 68 (see FIG. 3) to enable the feed gas in inner gap 20 to exit through apertures 68 and enter a gas return chamber 70. The total area of apertures 68 is sized to be much larger than the area of gas inlet 50 so there is no restriction in the gas passing through apertures 68 and entering chamber 70.

Gas return chamber 70 is formed by a support frame 72 similar to support frame 40 and includes a spacer tube 74 and an end plate 76 with suitable O-ring seals for sealing the respective end of the electrode assembly and defining gas return chamber 70 at the electrode assembly gas return end. In addition, end plate 76 includes aperture 78 which is adapted to receive an insulating rod 80 having a center conductor rod 82 threadably engaging inner electrode 12 at one end and having a high voltage terminal 84 at the other end.

Gas return chamber 70 has an annular passageway 86 which communicates chamber 70 with outer gap 22 between dielectric member 16 and outer electrode 14 so that the produced ozone and feed gas reverses direction and traverses the length of the electrode assembly from the gas return end back to the gas feed end. Further ozone production is of course obtained in gap 22. At the opposite gas feed end of the electrode assembly, outer gap 22 ends in a second annular passageway 88 which couples the ozone developed in gaps 20 and 22 along with the remaining feed gas into an ozone outlet chamber 90 defined within support frame 40. An ozone-gas outlet port 92 in spacer tube 42 enables the ozone collected in outlet chamber 90 along with the remaining feed gas to exit the ozone generator for storage and use.

Electrical power to the ozone generator 10 is controlled by a variable-voltage, high reactance transformer. A high voltage transformer is used to increase the primary voltage of 110 VAC or 220 VAC, 50/60 Hz to the 7,000–15,000 volts required for ozone production. One end of the output of the high voltage transformer is connected to terminal 84 and the other end is securely attached to housing 18 through which the outer electrode is grounded.

Reversing of the feed gas between inner gap 20 and outer gap 22 has been found to significantly increase the ozone production and the useful life of the electrode assembly. It is believed that these unexpected results are due to the more efficient cooling of both the inner and the outer surfaces of the dielectric member to reduce the temperature differential between these surfaces. In addition the unexpected results are believed due to the technique of passing all of the feed gas initially through inner gap 20 to enable ozone production, and then reversing the gas flow and passing the entire combination of developed ozone and feed gas through outer gap 22 to develop a much larger amount of ozone than is attained in a standard one-time through unit or even in a split gas, one-time through unit.

In a constructed embodiment of the invention, the following physical dimensions and operating values resulted in the following indicated ozone output production:

Length of electrodes 12 and 14—27¾ in. (70.5 cm)
Length of dielectric member 16—29½ in. (74.9 cm).
Outer diameter of electrode 12—1.25 in. (3.18 cm).
Inner diameter of electrode 14—1.70 in. (4.32 cm).
Width of inner gap 20—0.100 in. (2.54 mm).
Width of outer gap 25—0.166 in. (4.22 mm).
Eight Apertures 68 in cap 66, each 0.140 in. diameter (3.56 mm) for a total aperture area of 0.123 sq.in. (79.36 sq.mm).
Inlet 50—0.25 in. diameter (6.35 mm) for a total inlet area of 0.049 sq.in. (31.62 sq.mm).
Four passageways 54, each 0.156 in. diameter (3.96 mm).
Magnetic high reactance transformer with 14,000 volts between electrodes 12, 14.
Input air flow—0.167 CFM (5.09 CCM).
Output ozone—21 gms/cm or 5.9 gms/hour.

Figure 4:
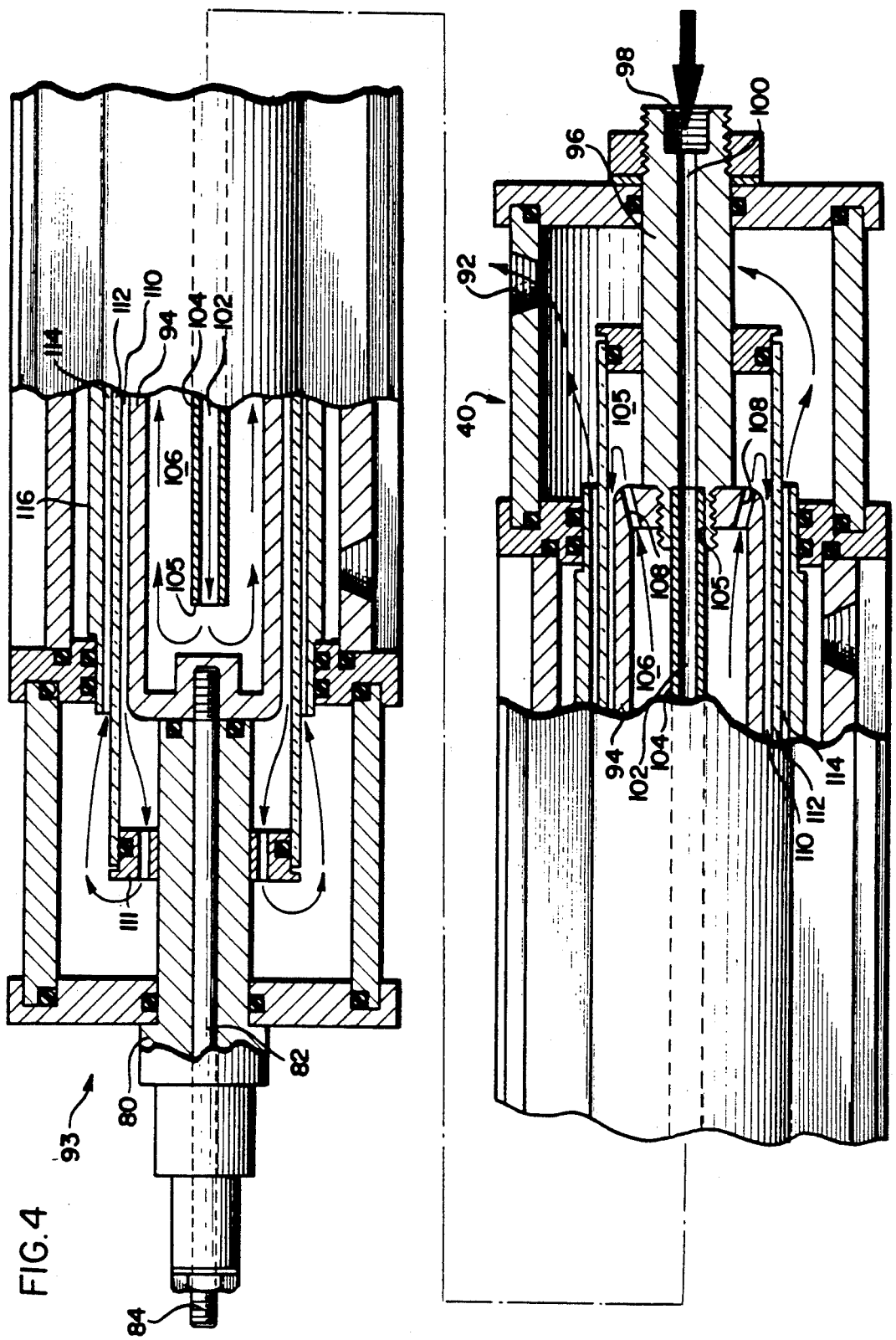
FIG. 4 is a longitudinal cross-sectional fragmented view illustrating an alternative embodiment of the invention.

An alternative embodiment 93 of the present invention is illustrated in FIG. 4. Notice that this embodiment utilizes the same aspect of the invention involving reversing of the total air flow between the inner electrode and the dielectric member and between the dielectric member and the outer electrode as in the first embodiment. However, in the embodiment of FIG. 4, electrode 94 is hollow and is threadably mounted to an insulating support rod 96 at the gas feed end. This permits gas through inlet 98 to enter passageway 100 of rod 96 and thereby communicate with a passageway 102 in a conduit 104 which is supportedly mounted within annular recess 105 in rod 100 at the gas feed end.

The feed gas is conveyed through conduit 104 to the opposite first gas return end of the electrode assembly where conduit end 105 is open to enable the feed gas to enter the hollow inner electrode interior 106. The feed gas therefore reverses direction and traverses the interior 106 of electrode 94 from the first gas return end back to the gas feed end to cool the inner electrode more efficiently.

At the gas feed end of electrode 94, apertures 108 are provided for reversing the gas flow so that the gas passes out of the interior 106 of electrode 94 and into antechamber 105 formed by sealing block 107. Block 107 also supports one end of the dielectric member on rod 96.

The feed gas now is directed to inner gap 110 between inner electrode 94 and dielectric member 112 to produce further ozone in gap 110. As in the first embodiment, the gas traverses the length of inner gap 110, exits through an apertured, dielectric member supporting end cap 111 at the second gas return end of the electrode assembly, again reverses direction and traverses outer gap 114 between dielectric member 112 and outer electrode 116 on its way to the gas feed end of the electrode assembly. The ozone produced in gaps 110 and 114 along with the remaining gas then exits through a suitable outlet port 92. This reversing of the total feed gas between inner gap 110 and outer gap 114 enables a higher ozone production and a more efficient cooling of both surfaces of the dielectric member. A water jacket may be provided for this embodiment as illustrated similar to that illustrated and described for the first embodiment.

Therefore, both of the above-described embodiments provide a total gas flow traversing the inner gap between the inner electrode and the dielectric member, reversing direction and traversing the outer gap between the dielectric member and the outer electrode. The significant advantage of this total gas reversing technique is that ozone is produced in both directions with the total gas flow. Thus, more feed gas is utilized in the discharge zones between the electrodes to produce more ozone than in prior devices, while also permitting the total gas flow to enable more efficient cooling of the electrode assembly. This unique apparatus and method provides a significant improvement in ozone production over prior available units.

Rather than initially passing the gas from the inner gap and then to the outer gap, it is possible to reverse this sequence. Accordingly, one may initially pass the feed gas through the outer gap between the outer electrode and the dielectric member and then reverse the gas direction and pass the feed gas between the inner gap formed between the dielectric member and the inner electrode. As in the illustrated embodiment of the invention herein, ozone from the total gas will be produced in both gaps. However, it is not believed that the best electrode assembly cooling conditions will be attained in this alternative outer-inner gap embodiment. Thus, the illustrated embodiments of the invention in FIGS. 1-4 herein with the gas passing first from the inner gap and then to the outer gap is the preferred configuration.

Figure 3:
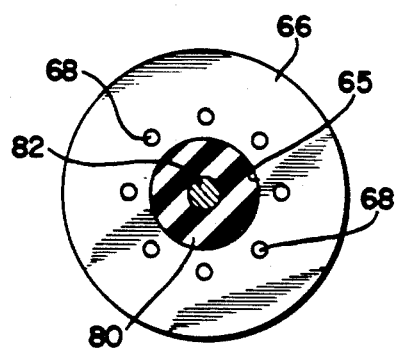
FIG. 3 is a cross-sectional view taken along section lines 3—3 of FIG. 1.
Figure 5:
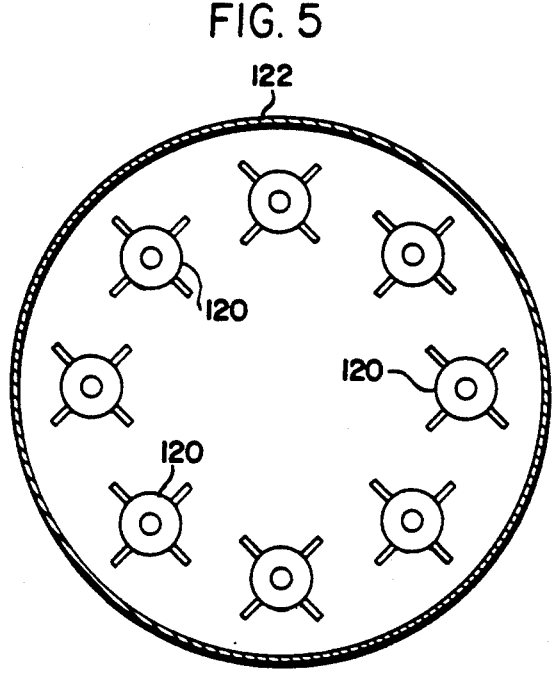
FIG. 5 is a schematic view illustrating a plurality of ozone generators according to the invention located in a single cabinet enclosure.
Figure 6:
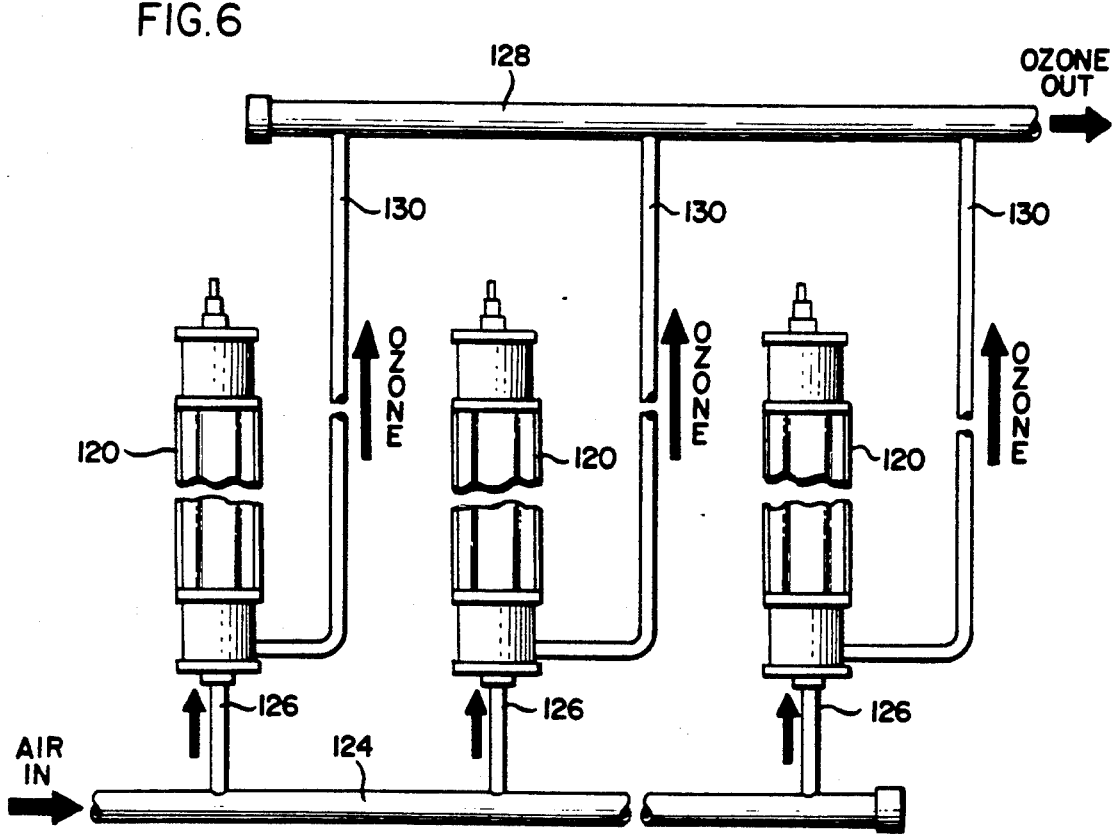
FIG. 6 is a schematic view illustrating the plurality of ozone generators of FIG. 5 joined together with input and output manifolds.

Referring now to FIGS. 5 and 6, there is schematically illustrated a combination of several ozone generators 120 which can be comprised of either the generator 10 of FIGS. 1-3 or the generator 93 of FIG. 4. Each of the ozone generators 120 are suitably mounted within a cabinet 122. FIG. 6 illustrates an intake manifold 124 for coupling a feed gas such as air to the respective feed gas input lines 126. Similarly, an output manifold 128 receives the respective ozone concentrated gas from each ozone output line 130 so that the total output ozone from manifold 128 comprises the total ozone produced by combining the outputs of ozone generators 120.

An alternative hollow inner electrode embodiment 132 of the present invention is illustrated in FIG. 7. This embodiment utilizes the same aspect of the invention involving reversing of the total air flow between the inner electrode and the dielectric member and between the dielectric member and the outer electrode as in the embodiments of FIGS. 1-3 and of FIG. 4, and is similar in many respects to the hollow inner electrode embodiment of FIG. 4. Thus, in the embodiment 132 of FIG. 7, feed gas is inserted in the inner gap 110 between a hollow inner electrode 134 and a dielectric member 112, exits the inner gap, reverses direction, and traverses the outer gap 114 between dielectric 112 and outer electrode 116 to issue from ozone outlet port 136.

In the preferred embodiment 132 of FIG. 7, the ozone generator is arranged vertically with feed gas inlet 98 at the top and ozone outlet port 136 at the bottom. Feed gas passes through passageway 100 directly into the interior 138 of the inner electrode. An apertured end cap 140 is sealably mounted to and supports dielectric member 112. End cap 140 includes central aperture 142 for accommodating insulating support rod 96 and also includes a plurality of apertures 143 for enabling gas in inner gap 110 to exit, reverse direction and enter into outer gap 114.

The input feed gas at the top of inner electrode 134 is passed into the hollow interior 138 and traverses downwardly towards the bottom of the interior so as to exit from inner electrode apertured closure wall 144 having apertures 146. At the bottom end of the ozone generator, there is provided a support insulator assembly which includes a dielectric support insulator 148 and a high voltage insulator 150.

Dielectric support insulator 148 is sealably mounted to dielectric member 112 and to the inner electrode apertured closure wall 144 so as to define an input gas chamber which reverses the direction of the feed gas exiting through apertures 146 and directs the feed gas to inner gap 110. The dielectric support insulator 148 also is sealably mounted to end plate 77 of the support frame 72 at the ozone generator bottom end so as to define an ozone outlet chamber 152. Dielectric support insulator 148 further includes an elongated central aperture adapted to accommodate center conducting rod 82 for supporting the inner electrode at the bottom ozone generator end.

High voltage insulator 150 is formed of ceramic material and includes a protruding plug portion 154 sized to enter into snug-fit engagement within a cavity of dielectric support insulator 148. It is preferred that high voltage insulator 150 be formed of a suitable material having high voltage electrical insulating properties, such as ceramic. Therefore, ceramic plug portion 154 suitably electrically insulates the high voltage present between conducting rod 82 and end plate 77 so as to inhibit voltage breakdowns which might otherwise occur.

Figure 8:
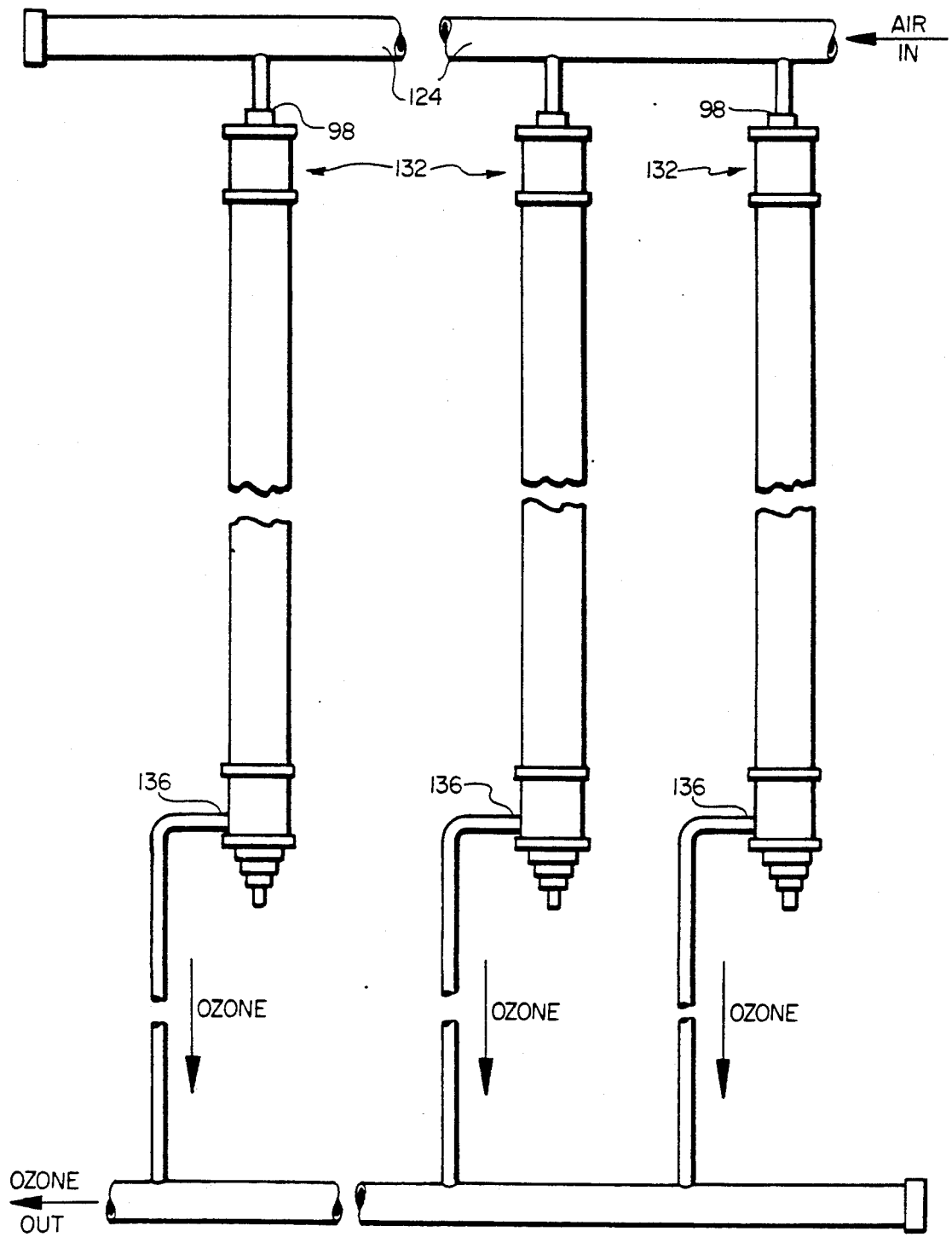
FIG. 8 is a schematic view illustrating a plurality of ozone generators of FIG. 7 joined together with input and output manifolds.

In the preferred configuration of embodiment 132, the feed gas is supplied to the top of the ozone generator, such as schematically illustrated in FIG. 8 wherein there is shown a combination of several ozone generators 132. In this preferred configuration, any contaminants within inner gap 110 may accumulate during ozone generation and tend to collect at the bottom of dielectric 112, adjacent support insulator 148. A bleed hole 156 is provided through support insulator 148 to communicate with inner gap 110 so as to eliminate any contaminant buildup inside dielectric 112. As indicated with the prior embodiments, rather than initially passing the gas from the inner gap and then to the outer gap, it is possible to reverse this sequence, however the illustrated embodiment shown in FIG. 7 is the preferred configuration.

In the operation of the preferred embodiment of FIG. 7, feed gas at inlet 98 is coupled through passageway 100 into interior 138 of the inner electrode and proceeds downwardly to the bottom end while cooling the inner electrode. The feed gas now exists through apertures 146, reverses direction and passes upwardly through inner gap 110 to produce ozone and to cool the dielectric member. Passing out through apertures 143 the gas reverses direction, enters outer gap 114, and passes downwardly to generate more ozone and to cool the dielectric member, finally collecting at ozone outlet chamber 152 for exiting out the ozone outlet port 136.

The foregoing detailed description has been given for clearness of understanding only, and no unnecessary limitations should be understood therefrom, as modifications will be obvious to those skilled in the art.

What is claimed is:

1. In a tubular type ozone generator having elongated inner and outer concentrically spaced electrodes with an elongated tubular dielectric member spaced between the electrodes, a housing supporting said outer electrode and including a cooling jacket for receiving cooling fluid around said outer electrode, a gas inlet for supplying a gas under pressure, and an ozone outlet, the improvement comprising:

said inner electrode being hollow and including input gas coupling means for receiving said gas under pressure from said gas inlet, said gas traversing from one end to the other end and within the interior of said hollow inner electrode for cooling said inner electrode with said gas from said gas inlet;

said inner electrode including an apertured closure wall at said other end with apertures extending from the interior to the exterior of said hollow inner electrode to enable said gas to readily exit from said hollow inner electrodes;

first sealing means for communicating said gas exiting from said apertures at said inner electrode other end and to direct the gas to the inner space between said inner electrode and said dielectric member, said gas traversing within said inner space and from the other end of the dielectric member to the one end of the dielectric member;

annular cap means at said one end of the ozone generator between the dielectric member and the inner electrode and including an apertured dielectric end cap having a plurality of apertures, said apertured dielectric end cap mounted to the dielectric member with said gas in the inner space being enabled to pass through said apertures;

second sealing means at said one end of the ozone generator supporting said dielectric member and said inner electrode to said housing and communicating said gas from said inner space at the dielectric one end to the outer space between said dielectric member and said outer electrode, said gas traversing said outer space from one end of the outer electrode to the other outer electrode end;

third sealing means at the other end of the ozone generator supporting said inner electrode and said dielectric member to said housing and forming an ozone outlet chamber for communicating ozone from said outer space to said ozone outlet; and gas inlet conveying means for receiving said gas from said gas inlet and conveying said gas through said apertured dielectric end cap to said inner electrode input gas coupling means;

said gas traversing (1) in a first direction from one end of said inner electrode to the other end and within said interior for cooling said inner electrode; (2) then to said inner space between the inner electrode and the dielectric member to produce ozone and for cooling one surface of the dielectric member, (3) then through the apertured dielectric end cap, reversing direction and traversing said outer space between the dielectric member and the outer electrode for generating ozone and cooling the opposite surface of the dielectric member, and (4) then to the ozone outlet chamber for passing ozone and the remaining gas out of the ozone outlet port.

2. An ozone generator according to claim 1, wherein said first sealing means includes an insulating member sealably mounted to the other end of said dielectric member to form a reversing input gas chamber bounded by said insulating member, said dielectric member other end and said inner electrode apertured closure wall for receiving said gas from said interior of said hollow inner electrode, reversing and directing said gas to said inner space.

3. An ozone generator according to claim 2, wherein said third sealing means includes electrode support means for supporting said inner electrode and said elongated tubular dielectric member to said housing at said other end, and said ozone outlet chamber is defined between said support means, said insulating member and said dielectric member.

4. An ozone generator according to claim 3, wherein said insulating member is formed of a first portion (a) sealably mounted to support said dielectric member, (b) sealably mounted at a first portion inner end to said inner electrode at said apertured closure wall to define said input gas chamber, and (c) sealably mounted at a first portion outer end to said electrode support means to define said ozone outlet chamber, said first portion having an elongated aperture therethrough extending from said first portion inner end to the outer end, and having a cavity at said first portion outer end communicating with said elongated aperture;

and including a conducting rod with one end extending through the cavity and the elongated aperture for mounting on the inner electrode apertured closure wall to support the inner electrode, and with the opposite rod end connectable to a high voltage power source.

5. An ozone generator according to claim 4, wherein said insulating member includes a second portion formed of ceramic material and having an elongated plug extending from one end adapted for snug fitting engagement within said cavity, and a respective elongated aperture therethrough adapted to receive said conducting rod with the opposite rod end extending from said second portion, said first and second portions cooperating to inhibit high voltage breakdown between said conducting rod and said electrode support means.

6. An ozone generator according to claim 5, wherein said first portion includes a bleed hole for removing contaminants from said inner space.

7. An ozone generator according to claim 2, wherein said insulating member includes:

a first support portion having a cavity at an outer end and an elongated aperture extending from the cavity to an inner end; and a second high voltage insulating portion formed of ceramic material and having a plug protruding from one end adapted to snug fit engage within said cavity for inhibiting high voltage breakdown between said inner electrode and said outer electrode.

8. An ozone generator according to claim 7, wherein said first support portion includes a bleed hole for removing contaminants from said inner space.

* * * * *